(12) United States Patent
Pai

(10) Patent No.: US 10,362,099 B2
(45) Date of Patent: Jul. 23, 2019

(54) MULTIPLE INSTANCE TYPES SERVING A SINGLE WORKLOAD OR APPLICATION

(71) Applicant: Amazon Technologies, Inc., Seattle, WA (US)

(72) Inventor: Derek Solomon Pai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 14/748,198

(22) Filed: Jun. 23, 2015

(65) Prior Publication Data

US 2016/0381128 A1    Dec. 29, 2016

(51) Int. Cl.
*G06F 15/16* (2006.01)
*H04L 29/08* (2006.01)
*H04L 12/24* (2006.01)
*G06F 9/50* (2006.01)
*G06F 9/46* (2006.01)

(52) U.S. Cl.
CPC ............ *H04L 67/1008* (2013.01); *G06F 9/46* (2013.01); *G06F 9/5077* (2013.01); *H04L 41/0816* (2013.01)

(58) Field of Classification Search
None
See application file for complete search history.

(56) References Cited

U.S. PATENT DOCUMENTS

| | | | | |
|---|---|---|---|---|
| 2005/0278439 | A1* | 12/2005 | Cherkasova | H04L 67/06 709/223 |
| 2009/0055834 | A1* | 2/2009 | Ding | G06F 9/5077 718/104 |
| 2010/0115510 | A1* | 5/2010 | Ford | G06F 9/5077 718/1 |
| 2010/0191881 | A1 | 7/2010 | Tauter et al. | |
| 2012/0072762 | A1 | 3/2012 | Atchison et al. | |
| 2012/0179824 | A1* | 7/2012 | Jackson | G06F 9/5027 709/226 |
| 2013/0060919 | A1* | 3/2013 | Khandekar | G06F 9/45558 709/220 |
| 2014/0052768 | A1* | 2/2014 | Deng | H04L 67/42 709/201 |
| 2014/0082614 | A1* | 3/2014 | Klein | G06F 9/45558 718/1 |

(Continued)

OTHER PUBLICATIONS

International Search Report and Written Opinion dated Sep. 23, 2016, International Patent Application No. PCT/US2016/037249, filed Jun. 13, 2016.

*Primary Examiner* — Phyllis A Book
(74) *Attorney, Agent, or Firm* — Davis Wright Tremaine LLP

(57) ABSTRACT

An instance service of a computing resource service provider may provide computing system instances to customers of the computing resource service provider. The computing system instances may be used by the customer to execute various customer workloads. Furthermore, the computing system instances may include an instance type indicating an amount of computing resources allocated to computing system instance of the instance type. The instance service may obtain requirement and/or constraints associated with the workload and determine a configuration of instance types to include in a set of instances configured to execute the customer workload.

21 Claims, 10 Drawing Sheets

(56) References Cited

U.S. PATENT DOCUMENTS

2014/0351394 A1 11/2014 Elisha
2015/0277974 A1* 10/2015 Beale ................... G06F 9/4856
    714/19
2015/0378765 A1* 12/2015 Singh ................. G06F 9/45558
    718/1
2016/0357610 A1* 12/2016 Bartfai-Walcott .... G06F 9/5027

* cited by examiner

200

Standard Instance Type

| Name | vCPU | Memory (GB) | Storage (TB) | Benchmark |
|---|---|---|---|---|
| Small | 1 | 16 | 4 | 17 |
| Medium | 2 | 32 | 6 | 30 |
| Large | 4 | 64 | 8 | 54 |

Memory Optimized Instance Types

| Name | vCPU | Memory (GB) | Storage (TB) | Benchmark |
|---|---|---|---|---|
| Small | 4 | 64 | 4 | 65 |
| Medium | 8 | 128 | 6 | 131 |
| Large | 16 | 256 | 8 | 283 |

FIG. 2

MULTIPLE INSTANCE TYPES SERVING A SINGLE WORKLOAD OR APPLICATION

BACKGROUND

The use of network computing and storage has proliferated in recent years. The resources for network computing and storage are often provided by computing resource providers who leverage large-scale networks of computers, servers and storage drives to enable clients, including content providers, online retailers, customers and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. In response to this, computing resource service providers are introducing automated mechanisms to handle unanticipated traffic spikes or customer needs. In many cases, customers transmit requests to create instances such as, for example, virtual machine instances to execute on hardware devices. The instance can be used by the customer to satisfy their computing needs but may not be able to respond adequately to customer needs during unanticipated traffic spikes or needs.

BRIEF DESCRIPTION OF THE DRAWINGS

Various embodiments in accordance with the present disclosure will be described with reference to the drawings, in which:

FIG. 2 illustrates a table in which information corresponding to various instance types may be displayed in accordance with an embodiment;

DETAILED DESCRIPTION

Figure 1:
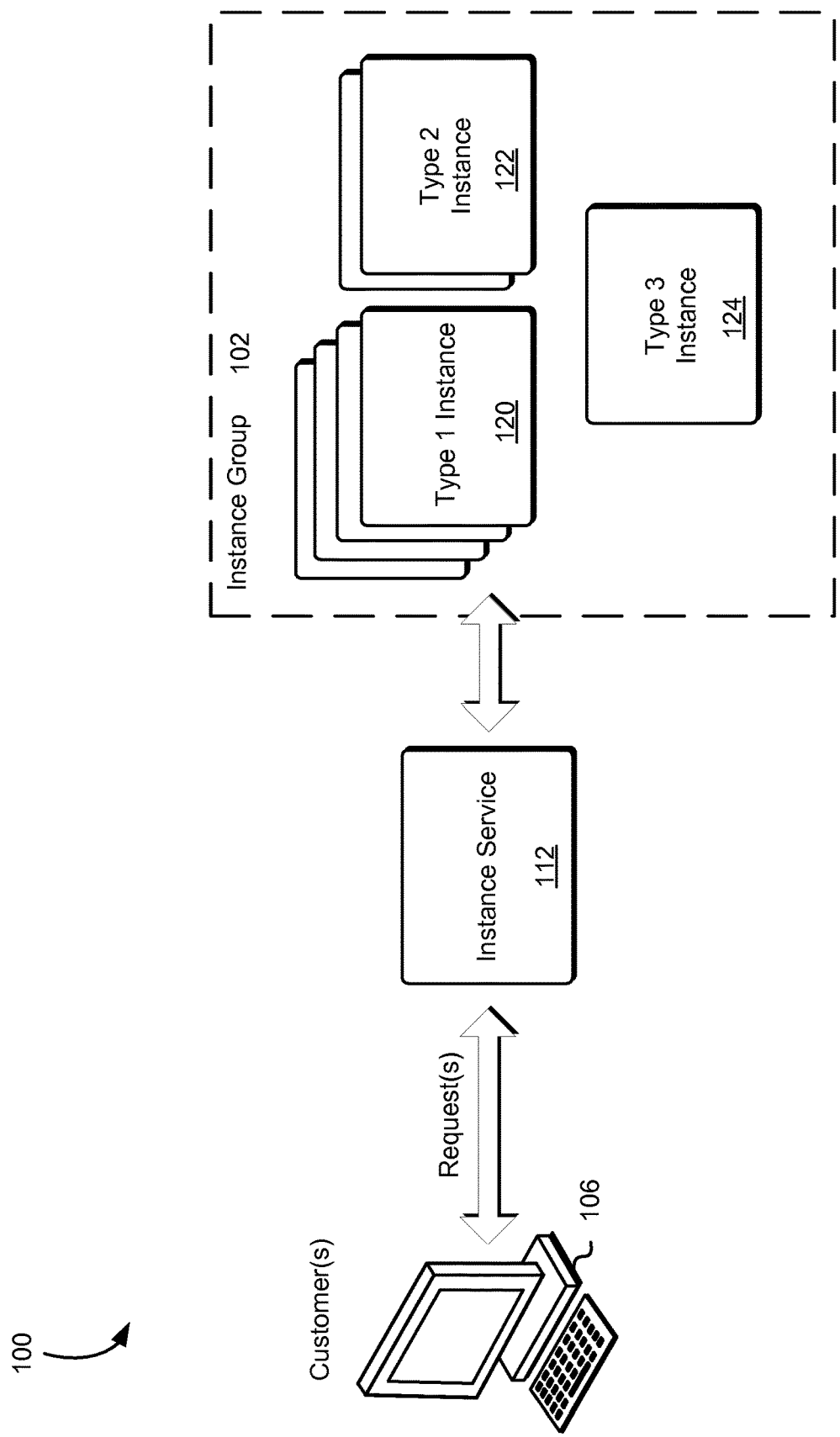
FIG. 1 illustrates an environment in which customers may be provided various instance types in a group of instances used to execute a customer workload or application in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements and management of various computing system instances provided by a computing resource service provider to customers. The computing resource service provider may provide an instance service, among other services, configured to provide customers with access to various computer systems instances. The computing system instances may be virtual machine instances or other computer systems executing a guest operating system and operated by the customer. The instance service may provide customers with various types of computing system instances. The various computing system instance types may have access to different types and/or amounts of computing resources provided by the computing resource service provider. For example, the instance service may provide a family of instance types, where all members of the family are based on the same virtual machine image but may have varying amounts of allocated computing resources (e.g., number of central processing unit (CPU) cores, processing power, memory, bandwidth, etc.). A "standard medium" instance type and a "standard large" instance type may differ only in the amount of computing resources allocated to each instance type. As described in greater detail below, the various instance types may have a fixed amount of computing capacity, memory capacity, and storage capacity.

A customer of the computing resource service provider may utilize computing system instances provided by the instance service to execute various workloads or applications on behalf of the customer. For example, the customer may use the computer instances to process image files received at a web-services interface operated by the customer. Furthermore, the customer may organize multiple computing system instances into groups or fleets of computing system instances configured to execute the customer workload or application. The customer may have various constraints and/or requirements to process the customer workload or execute the customer application. For example, the customer may require a minimum amount of processing capacity or memory capacity in order to execute the customer application. In another example, the customer may have a maximum budget for the computing resources provided by the computing resource service provider or may have a particular interval of time in which the customer workload must be completed. The instance service may be further configured to determine one or more computer instances that satisfy the customer constraints and requirements and instantiate a group of instances to process the customer workload or application based at least in part on the determination.

The instance service may determine an absolute and/or maximum capacity for each of the various instance types, for example, a number of virtual central processing units (vCPUs) allocated to a particular instance type or an amount of memory allocated to a particular instance type. Furthermore, the instance service may determine a capacity of instance types compared to other instance types. For example, the instance service may benchmark instance types and compare benchmarks between instance types to determine relative capacity of the various instances. The instance service may also provide customers with a mechanism for providing capacity requirements, e.g., the constraints and requirements described above, for a particular customer workload or application. The instance service may determine and instantiate a set of computing system instances satisfying the customer constraints and requirements based at least in part on information provided by the customer. The instance service or other services of the computing resources service provider may then manage, including reallocating and modifying, the set of computing system instances based at least in part on the information provided by the customer and operational information obtained by the computing resource service provider. For example, if an alternate configuration of instance types becomes cheaper during execution of the customer workload or application the instance service may reallocate computing resources to take advantage of the alternate configuration of instance types. In another example, if a particular configuration of instance types is performing below the customer's requirements, the instance service may reallocate the customer workload or application to an alternate configuration of instance types. This enables a combination of different instance types to be used to satisfy a customer's computing requirements.

FIG. 1 illustrates an environment 100 in which customers 106 may provide requests to an instance service 112 to interact with instances of various types included in an instance group 102. The instance service 112, described in greater detail below, may be provided to the customers 106 by a computing resource service provider and may allow customers to interact with and otherwise operate computing system instances implemented using computing resources of the computing resource service provider. The computing resource service provider may provide a variety of services to the customers 106 and the customers 106 may communicate with the computing resource service provider via an interface (not shown in FIG. 1), which may be a web services interface or any other type of customer interface. Although only the instance service 112 is shown in FIG. 1, the computing resource service provider may provide a variety of services to the customers 106. Furthermore, each service may have its own interface and, generally, subsets of the services may have corresponding interfaces in addition to or as an alternative to a single interface for the computing resource service provider.

The customers 106 may be organizations that may utilize one or more of the services provided by the computing resource service provider to maintain and deliver information to various entities, which may be located in various geographical locations. Additionally, the customers 106 may be individuals who utilize the services of the computing resource service provider to deliver content to a working group located remotely. The customers 106 may communicate with the computing resource service provider through a network, whereby the network may be a communication network, such as the Internet, an intranet or an Internet service provider (ISP) network. Some communications from the customers 106 to the computing resource service provider may cause the computing resource service provider to operate in accordance with one or more embodiments described herein or a variation thereof.

Additionally, at least a portion of the communications from the customers 106 may include requests configured to cause the computing resource service provider or component thereof to perform various operations. For example, the customers 106 may provide the instance service 112 with an application programming interface (API) call to instantiate a set of instances configured to execute a customer workload or application. Furthermore, the API call may include one or more constraints or capacity requirements for the customer workload or application. The API call may include information suitable for identifying the one or more instances of various types that may be suitable for performing the operations requested by the customer, e.g., the customer workload or application. The information suitable for identifying the one or more instances of various types may include an amount of computing capacity required, an amount of memory required, an amount of storage space required, a cost associated with executing the customer workload or application, execution associated with the customer workload or application, benchmark associated with various instance types, performance requirements of the customer workload or application, or any other constraint or requirement of the customer workload or application.

In response to the API call the instance service 112 may perform various operations in order to determine various configurations of instance types suitable for executing the customer workload or application. For example, the instance service 112 may determine a total number of vCPUs suitable for executing a particular customer workload based at least in part on information provided in the API call. The instance service 112 may then determine a set of various instance types to include in the instance group 102 from a set of available instances and/or set of available computing resources. The various instance types included in the instance group 102 may be comprise a particular instance configuration. As illustrated in FIG. 1, the instance service 112 may determine that there are sufficient computing system instances and/or computing resources to instantiate an instance configuration comprising four computing system instances of type one 120, two computing system instances of type two 122, and one computing system instances of type three 124 to be included in the instance group 102. The total number of vCPUs of the set of computing system instances may be greater than or equal to the total number of vCPUs required by the customer to execute the customer workload or application. For example, the API call submitted by the customer may indicate that at least 20 vCPUs are required and the total number of vCPUs of instance group 102, illustrated in FIG. 1, may be greater than or equal to 20.

As described herein, the different instance types may have different allotments of computing resources but may be capable of executing at least a portion of the customer workload or application as well as operate in connection with other computing system instances in the instance group 102. For example, the type one instances 120, the type two instances 122, and the type three instances 124 may each be capable of processing requests from a queue in connection with the customer workload or application. The instance service 112 may be configured to determine capacity and/or score (e.g., a measurement of the performance capabilities of a particular computing system instance type to other computing system instance types) for the instance types currently available to the customer. For example, all of the computing resources associated with providing customers with instance type four may be currently utilized by other customers or the computing resource service provider. If the customer was then to request a computer system of instance type four to execute a customer workload or application, the instance service 112 may determine or suggest an alternative instance type or set of alternative instance types suitable for executing the customer workload or application. In some examples, the service transparently implements the set of alternative instances or alternative configurations without alerting the user to the provision of the requested computing capacity.

In some embodiments, the alternative instance type or set of alternative instance types determined to be efficient, may not be allowed because it violates one or more weights and/or constraints provided by the customer or required to execute the customer workload or application. As mentioned herein, a number of factors may be used to determine the suitability of a particular solution (e.g., set of alternative instance types) that may result from such a particular determination of instance type capacity and customer constraints or requirements. Such factors include, but may not be limited to, satisfying instance type weights (e.g., the customer may weight or prefer certain instance types over other instance types) and/or constraints, balancing of resources, bandwidth of connections, latency of connections, instance group 102 complexity, business value of the alternative instance types, economic value of the alternative instance types and/or other such factors. In some embodiments, the alternative instance types may have one or more suitability scores based at least in part on these factors. When an alternative instance type results in a poor suitability score the instance service 112 may determine a different alternative instance type by, for example, searching the set of available instances for additional instance types suitable for executing the customer workload or application. In some embodiments, the instance service may apply random selection to the set of available instance types and determine whether the randomly selected instances satisfy the customer's requirements and constraints. The instance service 112 may determine the optimal instance type configuration using a variety of different methods including grid search, curve fitting, and/or interpolation.

In various embodiments, either prior to execution or during execution of the customer workload or application the instance service 112 may determine an alternative configuration of instance types, amiable to the instance service 112, which may be included in the instances group 102. The alternative configuration of instance types, which may only include computing system instances of a single instance type, may better satisfy one or more of the customer constraints or requirements. For example, the alternate configuration of instance types may cost the customer less money or may complete the workload quicker. In these situations, a notification service (not illustrated in FIG. 1 for simplicity) or other component of the computing resource service provider may provide the customer with a notification of the alternative configuration and enable the customer to select the alternative configuration.

The notification service may comprise a collection of computing resources collectively configured to provide a web service or other interface and browser-based management console. The management console, described in greater detail below, can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service may provide notifications to clients using a "push" mechanism without the need to periodically check or "poll" for new information and updates. The notification service may further be used for various purposes such as monitoring applications executing in an instance group 102, workflow systems, time-sensitive information updates, mobile applications, and many others.

FIG. 2 illustrates a table 200 in which information corresponding to various instance types may be displayed and used by an instance service to determine a configuration of instance types suitable for executing a customer workload or application in accordance with an embodiment. The table 200 may be generated by the instance service and may express a capacity and/or score of various instance types. The table 200 may indicate various attributes of the instance types associated with the instance types' capacity, such as the number of vCPUs allocated to the instance type or amount of memory allocated to the instance type. Furthermore, as illustrated by FIG. 2, benchmarks may be used to compare instance types relative to one another. In some embodiments, the table 200 may include a score for each instance type calculated relative to other instance types. For example, a small standard instance type may be assigned a score of one unit of capacity, a medium standard instance type four units of capacity, and a large standard instance type 14 units of capacity. The unit of capacity may be assigned based at least in part on the instance types' ability to execute the customer workload or application. The instance service 112 and/or customer may benchmark or otherwise test the various instance types performing the same customer workload in order to determine the number of units of capacity relative to the other instance types.

As illustrated by the table 200, the instance service may evaluate and determine performance capabilities of the various instance types across multiple dimensions. The instance service may also select optimal configurations across one or more dimensions, for example, optimizing the configuration of instance types based on memory, benchmarks, and cost. The cost of a particular instance type may be fixed or may fluctuate according to a market for instance. For example, during periods of peak customer usage the price of various instance types may increase with demand for the various instance types. Alternatively, during periods of underutilization of computing resources of the computing resource service provided, the cost for a particular instance type may decrease according to demand. In various embodiments, a scoring algorithm is used to consolidate the various dimensions included in the table 200 to a single value. In addition, other values, such as the cost of a particular instance according to the mark as described above, may be included in the algorithm used to consolidate the various dimensions included in the table 200.

Additionally, the instance service may determine a capacity requirement for a particular customer workload or application. The capacity requirement may correspond to the information included in the table 200. For example, the capacity requirement for the customer workload may be represented in a number of vCPUs or total amount of memory. Furthermore, benchmarks and similar information may be included in the capacity requirement. For example, if the customer workload includes processing a video file of at least a certain size, each individual computing system instance in the group of instances must have sufficient capacity to process the video file. Put another way, selection of a configuration of instance types may be constrained by a requirement that each individual instance of the group of instances have sufficient capacity for a particular operation. This may avoid a situation in which the total capacity of the group of instances satisfies the capacity requirement of the customer workload or application, but individual instances of the group of instances may not have sufficient capacity to perform one or more operations of the customer workload or application.

The customer may also provide the instance service with constraints and/or requirements for the customer workload or application. For example, the customer may indicate to the instance service that application 'X' needs 10 units of overall capacity, application 'Y' needs at least five units of compute capacity and eight units of memory capacity, and workload 'Z' needs 14 combined units of memory and network throughput. Furthermore, the customer may also provide constraints on the group of instances. For example, the customer may indicate an instance group with no more than eight and no fewer than four instances and using no more than two different types of instances. Additionally, the customer may express constraints such as total cost or elapsed time. For example, the customer may indicate that workload 'X' may require at least 10 units of capacity for 20 capacity-hours of work, such that an instance group with 10 units of capacity can complete the workload in 2 hours or an instance group with 20 units of capacity can complete the workload in an hour. In another example, the customer may indicate that application 'Y' may need to acquire an amount of capacity sufficient to execute the application for the lowest available price or for no more than $10 per hour of execution.

Other constraints may be determined by the instance service or other service of the computing resource service provider. For example, if a particular customer workload or application includes a database with a maximum of 20 simultaneous connections, the instance service may limit that total number of instances in the configuration of instance types to less than 20. In another example, the number of instances in the configuration of instance types may be limited to the number Internet Protocol (IP) address available to the customer. The table 200 and customer constraints and/or requirements may be provided by the instance service to one or more other services of the computing resource service provider. An auto-scale service or load balancing service, described in greater detail below, may be provided with the table 200 and perform various operations based at least in part on the information included in the table 200. For example, a load balancing service may distribute load according to the capacity information included in the table 200. In another example, the auto-scale service may add instances of a particular type to an auto-scale group based at least in part on the table 200 and customer constraints and/or requirements.

Figure 3:
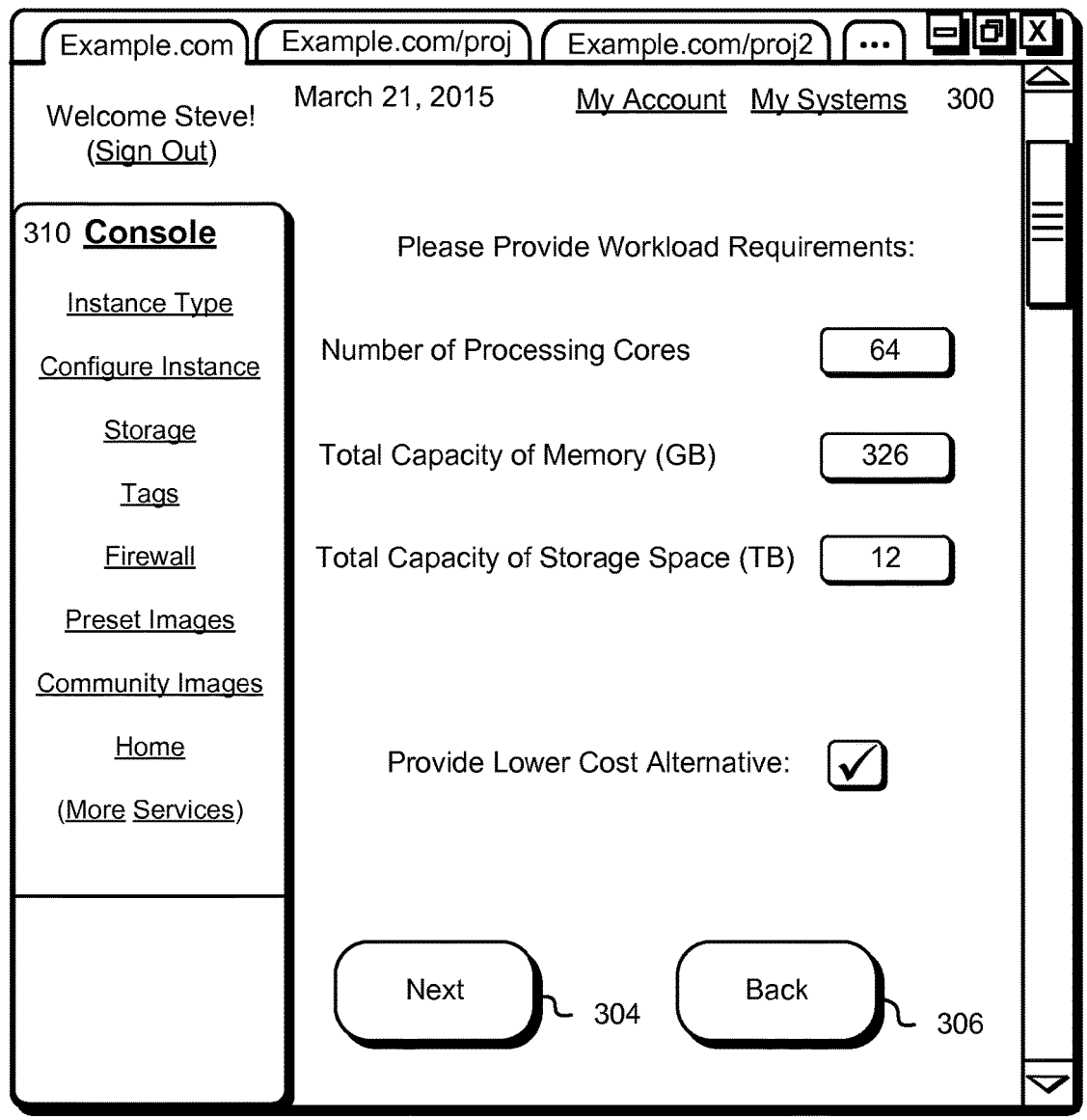
FIG. 3 is a diagram illustrating a management console exposed as a webpage enabling customers to select lower cost alternative instance types in accordance with at least one embodiment.

FIG. 3 shows a webpage 300 which may be displayed by an application executed by a computing system enabling a user to interact with an instance service operated by the computing resource service provider. As illustrated in FIG. 3, the webpage 300 includes various graphical user interface elements that enable users to provide workload requirements for a customer workload or application to be executed by a set of instances provided by the instance service using computing resources of the computing resource service provider through a management console of which the webpage 300 is a part. In various embodiments, the user interacts with the instance service by issuing commands through the management console. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to a variety of different actions the user may cause to be performed.

The console pages may correspond to operations that may be taken to manage or otherwise control instances of various types managed by the instance service or other computing services of the computing resource service provider. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, a request, such as an HTTP request, for the content associated with the link to a server that provided the webpage 300 or another server.

In this example, the webpage 300 also includes a graphical user element configured as a "next" button 304. The next button 304 may be a graphical user interface element of the webpage 300 where the underlying code of the webpage 300 is configured such that selection by an input device of the next button 304 causes information corresponding to the selection of a particular workload requirement and possible lower cost alternatives selected on the webpage 300 to be transmitted to the instance service. Furthermore, through the management console, the user may be guided through the process of selecting various constraints and/or requirements associated with a workload or application to be executed by the set of instances. The process may be divided into steps and the user may be prompted to provide information at each step. For example, the webpage 300 displays to the user a list of different types of computing system instances suitable for executing the customer workload or application.

The user, using an input device, may select a set of instances to execute the customer workload or application. Additionally, the customer may indicate a preference for executing the workload or application using a lower cost alternative configuration of instance types. For example, as described above, during execution of the customer workload or application if a lower cost configuration of instance types is determined by the instance service, the instance service may reallocate the customer workload or application to a lower cost alternative set of instances based at least in part on the determined lower cost configuration of instance types. The user selection may be stored until the entire process is completed or the user selection may be transmitted to the instance service upon selection of a graphical user interface element.

As illustrated in FIG. 3, the webpage 300 may contain a graphical user interface element configured as an input box configured to enable the user to enter a desired value for one or more workload requirements. The workload requirements may correspond to a particular capacity or unit of capacity associated with computing system instances capable of executing the customer workload or application. For example, the user may input a number of processing cores of a set of vCPUs capable of executing the customer workload or application. The management console of which webpage 300 is a part may also be configured such that the management console is connected to or responsible for an instance group as described above in connection with FIG. 1. For example, the management console may provide an interface for managing the executing of the instance group and provisioning computing resources to the instance group.

The webpage 300 may also include a graphical user element configured as a "back" button 306. The back button 306 may be a graphical user interface element of the webpage 300 where the underlying code of the webpage 300 causes the application displaying the webpage 300 to transmit a command to the computing systems to return to a previously navigated webpage of the management console. In this example, the webpage 300 contains a prompt asking the user to provide workload requirements for a particular customer workload in the form of capacity requirements as described above in connection with FIG. 2. The capacity requirements provided using the webpage 300 may be included in webpage 300 based at least in part on user preference, popularity among users, features of the computing system instances, features of the computing system instances selected by the user, capacity requirements selected by the user, an administrator associated with the customer workload or application, or other information suitable for providing requirements associated with a customer workload or application.

Once the user has made a selection using the webpage 300 and selected the next button 304, the application displaying the webpage 300 may submit a request, such as an HTTP request, to the instance service to determine a configuration of instance type suitable for executing the customer workload or applications based at least in part on the requirements provided in the webpage 300. The request may be transmitted to one or more servers of the instance service operated by the computing resource service provider. Furthermore, the instance service may obtain additional information from one or more other services in order to complete the request from the user. For example, the instance service may obtain capacity information, as described above in connection with FIG. 2, from a data storage service.

The instance service may then determine a set of instance types suitable for executing the customer workload or application. The instance service may then generate a set of configurations of instance types from the determined set of instance types which satisfy the customer requirements provided through webpage 300. The instance service may also determine an optimal configuration of instance types from the generated set of configurations of instance types. For example, the instance service may determine the configuration of instance types with the lowest cost to the customer. The instance service may then instantiate a group of instances according to the selected configuration of instance types. In various embodiments, the instance service or other service of the computing resource service provider returns, in response to the a request, such as an HTTP request, from the user, identification information configured to identify the selected configuration of instance types instantiated in response to the user's request such that the user may operate and manage the group of instances included in the configuration of instance types based at least in part on the identification information. As discussed above, in other examples, the service may transparently implement the set of alternative instances or alternative configurations without alerting the user, while at the same time still providing the requested computing capacity.

Figure 4:
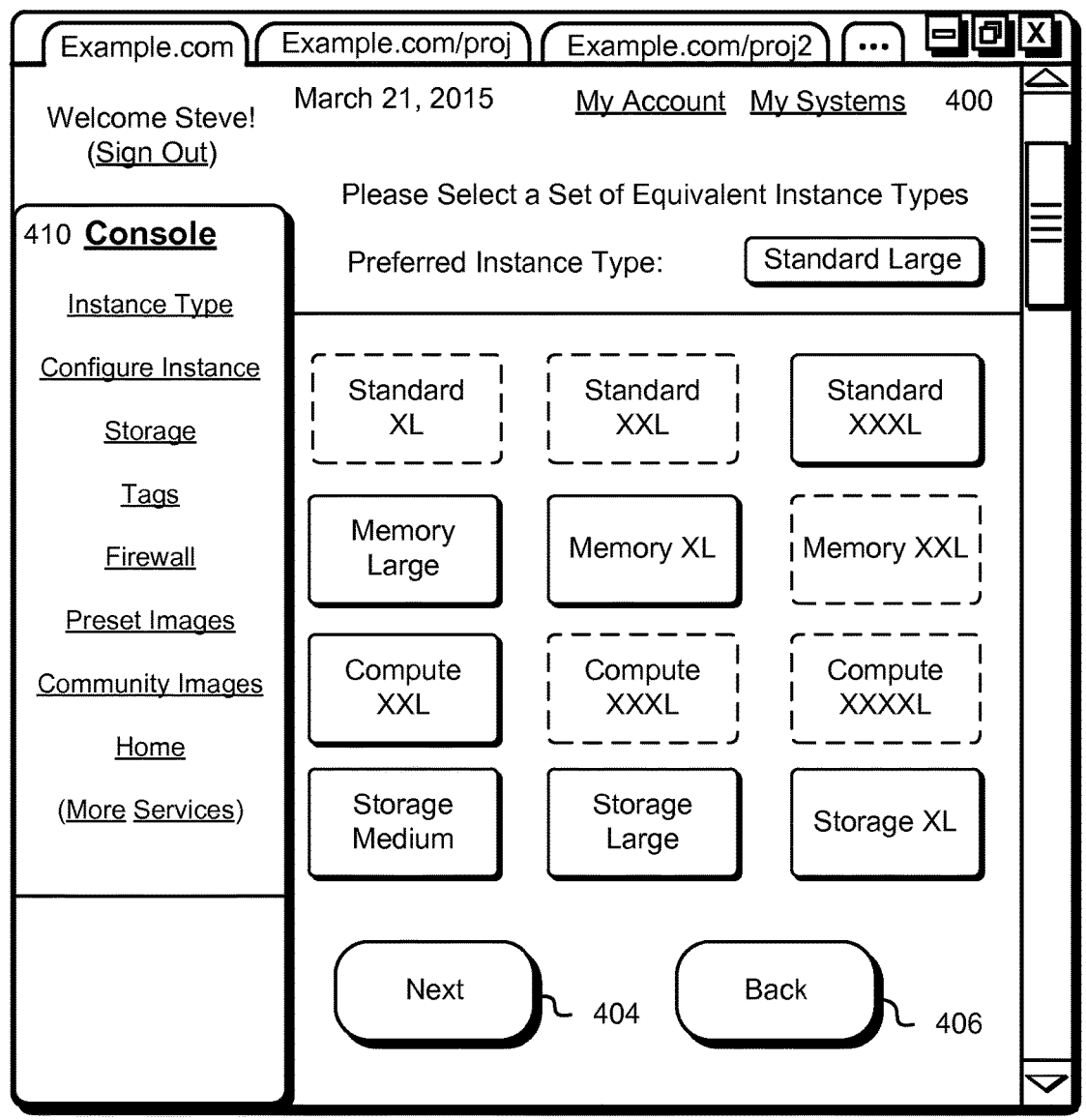
FIG. 4 is a diagram illustrating a management console exposed as a webpage enabling customers to select preferred and alternative instance types in accordance with at least one embodiment.

FIG. 4 shows a webpage 400 which may be displayed by an application executed by a computing system enabling a user to interact with an instance service operated by the computing resource service provider. As illustrated in FIG. 4, the webpage 400 includes various graphical user interface elements that enable users to provide preference information for computing system instances provided by the instance service using computing resources of the computing resource service provider through a management console of which the webpage 400 is a part. In various embodiments, the user interacts with the instance service by issuing commands through the management console. The command may include an API call generated by the webserver providing the webpage 400. The webpage 400 may be displayed by various applications, such as a mobile application or web browser. In this example, the webpage 400 includes various navigational features. For instance, on the left-hand side of the webpage 400, various links 410 may link to one or more other webpages that contain additional content corresponding to a variety of different actions the user may cause to be performed.

The console pages may correspond to operations that may be taken to manage or otherwise control instances of various types managed by the instance service or other computing services of the computing resource service provider. In this example, the links appear as textual words which enable the links to be selected using an appropriate input device such as a keyboard, mouse, touchscreen or other input device. Selection of one of the links 410 may cause an application displaying the webpage 400 to submit, pursuant to a URL associated with the selected link by the programming of the webpage 400, a request, such as an HTTP request, for the content associated with the link to a server that provided the webpage 400 or another server.

In this example, the webpage 400 also includes a graphical user element configured as a "next" button 404. The next button 404 may be a graphical user interface element of the webpage 400 where the underlying code of the webpage 400 is configured such that selection by an input device of the next button 404 causes information corresponding to the selection of a preferred instance type and acceptable equivalents for the user selected on the webpage 400 to be transmitted to the instance service. Furthermore, through the management console, the user may be guided through the process of selecting various constraints and/or requirements associated with the user's preferred instance type and selected equivalents. The process may be divided into steps and the user may be prompted to provide information at each step. For example, the webpage 400 displays to the user a list of different types of computing system instances suitable for use as an equivalent instance type.

The user, using an input device, may select a set of instance types which may be treated as equivalent by the instance service. As illustrated in FIG. 4, the user's preferred instance type is a standard large instance, however if there is insufficient capacity for a number of standard large instances required to execute the customer workload or application, the instance service may use one or more selected equivalents to provide the capacity required to execute the customer workload or application. In this example, the selection of equivalents is shown in FIG. 4 as boxes with a dashed-line perimeter representing a particular instance type of the set of instance types displayed to the user. The user selection may be stored until the entire process is completed or the user selection may be transmitted to the instance service upon selection of a graphical user interface element.

The webpage 400 may also include a graphical user element configured as a "back" button 406. The back button 406 may be a graphical user interface element of the webpage 400 where the underlying code of the webpage 400 causes the application displaying the webpage 400 to transmit a command to the computing systems to return to a previously navigated webpage of the management console. In this example, the webpage 400 contains a prompt asking the user to provide a set of equivalent instance types which may be included in a group of instances as described above in connection with FIG. 1. The instance types provided using the webpage 400 may be included in webpage 400 based at least in part on user preference, popularity among users, features of the computing system instances, features of the computing system instances selected by the user, capacity requirements selected by the user, capacity of the instance types, benchmarks or other scores associated with the instance types, an administrator associated with the customer workload or application, or other information suitable for a set of equivalent instance types associated with a customer workload or application.

Once the user has made a selection using the webpage 400 and selected the next button 404, the application displaying the webpage 400 may submit a request, such as an HTTP request, to the instance service to determine a configuration of instance types suitable for executing the customer's workload or applications based at least in part on the selected equivalent instance types provided in the webpage 400. The request may be transmitted to one or more servers of the instance service operated by the computing resource service provider. Furthermore, the instance service may obtain additional information from one or more other services in order to complete the request from the user. For example, the instance service may obtain capacity information, as described above in connection with FIG. 2, from a data storage service.

The instance service may then determine a set of instance types suitable for executing the customer workload or application. The instance service may then generate a set of configurations of instance types from the selected equivalent set of instance types which satisfy the customer's requirements provided through webpage 400. The instance service may also determine an optimal configuration of instance types from the generated set of configurations of instance types. For example, the instance service may determine the configuration of instance types with the fewest number of total instances or the shortest execution time. The instance service may then instantiate a group of instances according to the selected configuration of instance types. In various embodiments, the instance service or other service of the computing resource service provider returns, in response to the request from the user, identification information configured to identify the selected configuration of instance types instantiated in response to the user's request such that the user may operate and manage the group of instances included in the configuration of instance types based at least in part on the identification information. As discussed above, in other examples, the service may transparently implement the set of alternative instances or alternative configuration without alerting the user, while at the same time still providing the requested computing capacity.

Figure 5:
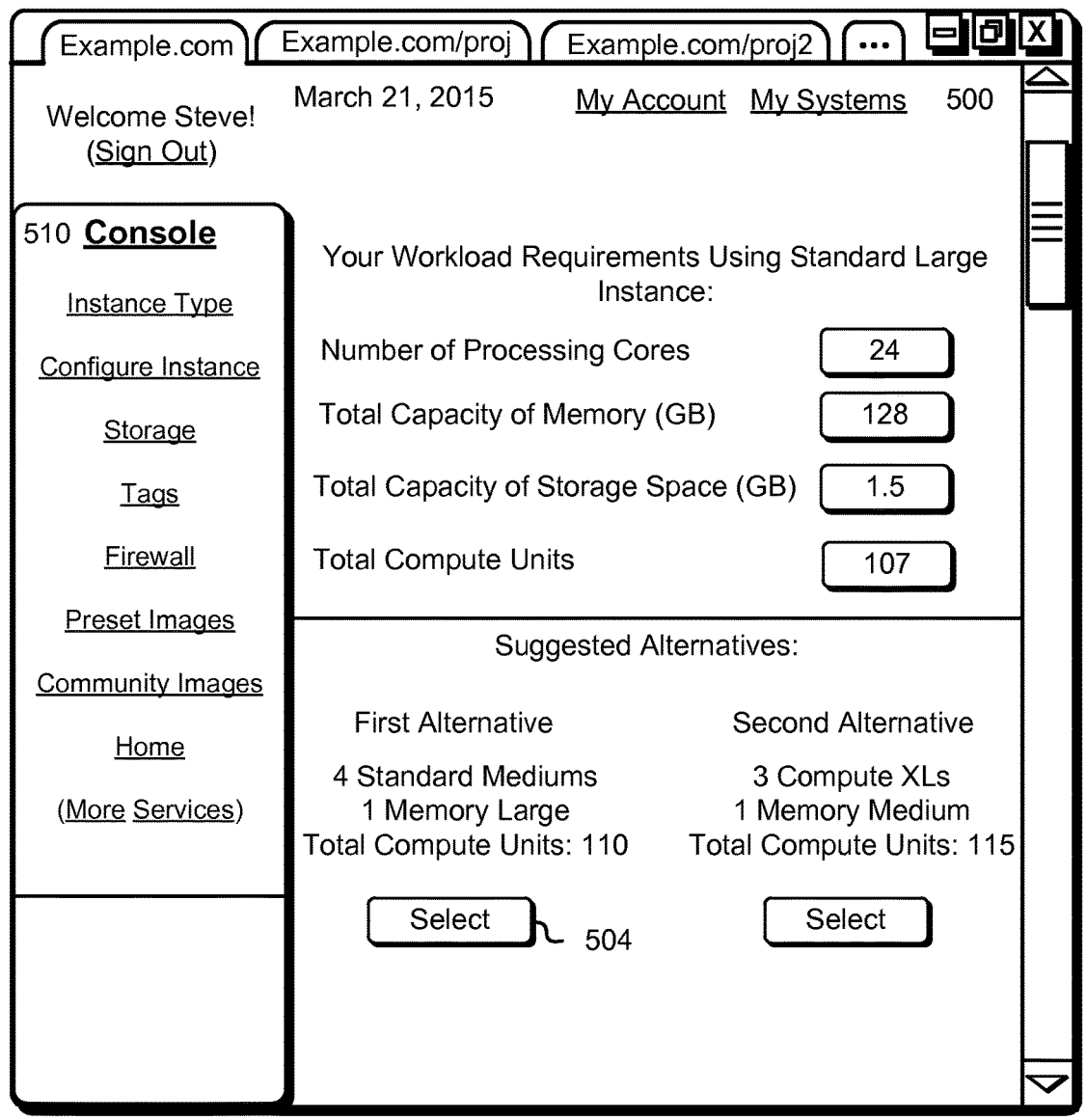
FIG. 5 is a diagram illustrating a management console exposed as a webpage enabling customers to select an alternative instance group in accordance with at least one embodiment.

FIG. 5 shows a webpage 500 which may be displayed by an application executed by a computing system enabling a user to interact with an instance service operated by the computing resource service provider. As illustrated in FIG. 5, the webpage 500 includes various graphical user interface elements that enable users to provide workload requirements for a customer workload or application to be executed by a set of instances provided by the instance service using computing resources of the computing resource service provider through a management console of which the webpage 500 is a part. Furthermore, the instance service may provide alternative configurations of instance types to the user through the webpage 500 which may be selected by the user to execute the customer workload or application. In various embodiments, the user interacts with the instance service by issuing commands through the management console. The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to a variety of different actions the user may cause to be performed.

The console pages may correspond to operations that may be taken to manage or otherwise control instances of various types managed by the instance service or other computing services of the computing resource service provider. In this example, the links appear as textual words which enable the links to be selected using an appropriate input device such as a keyboard, mouse, touchscreen or other input device. Selection of one of the links 510 may cause an application displaying the webpage 500 to submit, pursuant to a URL associated with the selected link by the programming of the webpage 500, a request, such as an HTTP request, for the content associated with the link to a server that provided the webpage 500 or another server.

In this example, the webpage 500 also includes a graphical user element configured as a "select" button 504. The select button 504 may be a graphical user interface element of the webpage 500 where the underlying code of the webpage 500 is configured such that selection by an input device of the select button 504 causes information corresponding to the selection of a particular alternative configuration of instance types selected on the webpage 500 to be transmitted to the instance service. Furthermore, through the management console, the user may be guided through the process of selecting various constraints and/or requirements associated with a workload or application to be executed by a set of instances corresponding to the alternative configuration of instance types. The process may be divided into steps and the user may be prompted to provide information at each step. For example, the webpage 500 displays to the user a list of different types of computing system instances suitable for executing the customer workload or application.

The user, using an input device, may select the alternative configuration of instance types to execute the customer workload or application. The user selection may be stored until the entire process is completed or the user selection may be transmitted to the instance service upon selection of a graphical user interface element. As illustrated in FIG. 5, the webpage 500 may contain a graphical user interface element configured as an input box configured to enable the user to enter a desired value for one or more workload requirements which may be used by the instance service to determine alternative configurations with sufficient capacity to satisfy the workload requirements. The workload requirements may correspond to a particular capacity or unit of capacity associated with computing system instances capable of executing the customer workload or application. For example, the user may input a number of processing cores of a set of vCPUs capable of executing the customer workload or application. The management console of which webpage 500 is a part may also be configured such that the management console is connected to or responsible for an instance group as described above in connection with FIG. 1. For example, the management console may provide an interface for managing the executing of the instance group and provisioning computing resources to the instance group.

In this example, the webpage 500 contains a prompt suggesting alternative configurations of instances in a group of instances configured to execute the customer workload or application. The alternatives may be generated based at least in part on capacity information, such as the capacity information described above in connection with FIG. 2. The alternative configurations of instance types provided using the webpage 500 may be included in webpage 500 based at least in part on user preference, popularity among users, features of the computing system instances, features of the computing system instances selected by the user, capacity requirements selected by the user, an administrator associated with the customer workload or application, benchmarks or other scores associated with the instance types, capacity of the instance types, or other information suitable for providing requirements associated with a customer workload or application.

Once the user has made a selection using the webpage 500 and selected the select button 504, the application displaying the webpage 500 may submit a request, such as an HTTP request, to the instance service to instantiate a set of instances corresponding to the selected alternative configuration of instance types configured to execute the customer workload or applications based at least in part on the customer's requirements and/or constraints. The request may be transmitted to one or more servers of the instance service operated by the computing resource service provider. Furthermore, the instance service may obtain additional information from one or more other services in order to complete the request from the user.

Figure 6:
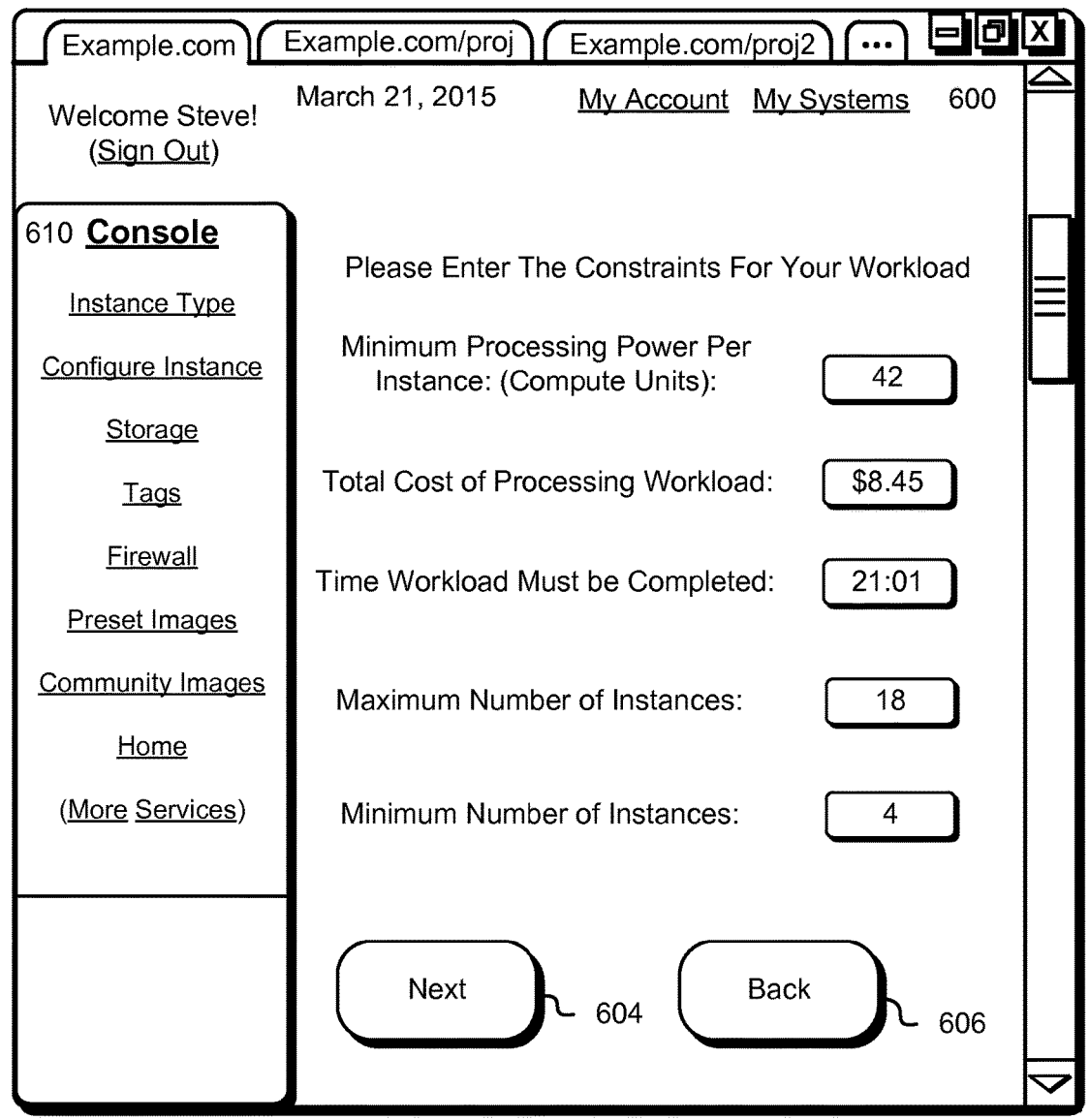
FIG. 6 is a diagram illustrating a management console exposed as a webpage enabling customers to provide workload constraints in accordance with at least one embodiment.

FIG. 6 shows a webpage 600 which may be displayed by an application executed by a computing system enabling a user to interact with an instance service operated by the computing resource service provider. As illustrated in FIG. 6, the webpage 600 includes various graphical user interface elements that enable users to provide workload constraints for a customer workload or application to be executed by a set of instances provided by the instance service using computing resources of the computing resource service provider through a management console of which the webpage 600 is a part. In various embodiments, the user interacts with the instance service by issuing commands through the management console. The webpage 600 may be displayed by various applications, such as a mobile application or web browser. In this example, the webpage 600 includes various navigational features. For instance, on the left-hand side of the webpage 600, various links 610 may link to one or more other webpages that contain additional content corresponding to a variety of different actions the user may cause to be performed.

The console pages may correspond to operations that may be taken to manage or otherwise control instances of various types managed by the instance service or other computing services of the computing resource service provider. In this example, the links appear as textual words which enable the links to be selected using an appropriate input device such as a keyboard, mouse, touchscreen or other input device. Selection of one of the links 610 may cause an application displaying the webpage 600 to submit, pursuant to a URL associated with the selected link by the programming of the webpage 600, a request, such as an HTTP request, for the content associated with the link to a server that provided the webpage 600 or another server.

In this example, the webpage 600 also includes a graphical user element configured as a "next" button 604. The next button 604 may be a graphical user interface element of the webpage 600 where the underlying code of the webpage 600 is configured such that selection by an input device of the next button 604 causes information corresponding to the constraints associated with the customer workload inputted into the webpage 600 to be transmitted to the instance service. Furthermore, through the management console, the user may be guided through the process of selecting various constraints and/or requirements associated with a workload or application to be executed by the set of instances. The process may be divided into steps and the user may be prompted to provide information at each step. For example, the webpage 600 displays to the user a list of different types of constraints which may be placed on a set of instances executing the customer workloads or applications.

The user, using an input device, may provide one or more constraints on a set of instances configured to execute the customer workload or application. As illustrated in FIG. 6, the webpage 600 may contain a graphical user interface element configured as an input box configured to enable the user to enter a desired value for one or more workload constraints. For example, the user may input a desired cost for executing the workload, or an interval of time in which the workload must be completed, or an interval of time after which the workload is to start (e.g., execution of the workload after 2 a.m.), or another workload that must be completed prior to execution of the workload. Other constraints may include various performance constraints. For example, the computer system instances must be capable of loading a particular webpage or file within a specified timeframe, such as in under two seconds. Another example of a performance constraint is a work rate requirement for computing system instances. A work rate requirement, described in greater detail below, may indicate a rate at which the computing system instances complete a workload or a portion of a workload. For example, the customer's workload may include transcoding images from one format to one or more other formats. The work rate may be the rate at which the computing system instance transcodes an image as required by the customer workload. The management console of which webpage 600 is a part, may also be configured such that the management console is connected to or responsible for an instance group as described above in connection with FIG. 1. For example, the management console may provide an interface for managing the execution of the instance group and provisioning computing resources to the instance group.

The webpage 600 may also include a graphical user element configured as a "back" button 606. The back button 606 may be a graphical user interface element of the webpage 600 where the underlying code of the webpage 600 causes the application displaying the webpage 600 to transmit a command to the computing systems to return to a previously navigated webpage of the management console. In this example, the webpage 600 contains a prompt asking the user to provide workload constraints for a particular customer workload. The constraints provided using the webpage 600 may be included in webpage 600 based at least in part on user preference, popularity among users, features of the computing system instances, features of the computing system instances selected by the user, capacity requirements selected by the user, an administrator associated with the customer workload or application, or other information suitable for providing requirements associated with a customer workload or application.

Once the user has made a selection using the webpage 600 and selected the next button 604, the application displaying the webpage 600 may submit a request, such as an HTTP request, to the instance service to determine a configuration of instance types suitable for executing the customer workload or applications based at least in part on the constraints provided in the webpage 600. The request may be transmitted to one or more servers of the instance service operated by the computing resource service provider. Furthermore, the instance service may obtain additional information from one or more other services in order to complete the request from the user. For example, the instance service may obtain capacity information, as described above in connection with FIG. 2, from a data storage service.

The instance service may then determine a set of instance types suitable for executing the customer workload or application. The instance service may then generate a set of configurations of instance types from the determined set of instance types which satisfy the customer's constraints provided through webpage 600. The instance service may also determine an optimal configuration of instance types from the generated set of configurations of instance types. For example, the instance service may determine the configuration of instance types with the lowest cost to the customer. The instance service may then instantiate a group of instances according to the selected configuration of instance types. In various embodiments, the instance service or other service of the computing resource service provider returns, in response to the request from the user, identification information configured to identify the selected configuration of instance types instantiated in response to the user's request such that the user may operate and manage the group of instances included in the configuration of instance types based at least in part on the identification information.

The environment such as that illustrated in FIG. 1 may be useful for a provider such as a computing resource provider, wherein the computing resource system responds to requests from customers to manage instances configured to execute a customer workload or application. As discussed above, the computing resource system provides a mechanism to allow customers to provide various requirements and/or constraints associated with the instances configured to execute the customer workload or application. The environment in such a case may include additional components and/or other arrangements, such as those illustrated in the networked environment 700 of FIG. 7. In this example, the networked environment 700 includes a computing resource service provider 704 in data communication with a client device 708 and server computers 742 over a network 706. In one embodiment, the server computers 742 may be one or more computer hardware devices that are used to implement instances 720. For example, the server computers 742 may include hardware for implementing types of computing resources, such as storage devices, virtualized storage devices, networking devices, and the like. Additionally, the implemented computing resources may be programmatically and remotely managed by a customer of the distributed computing resource provider.

The server computers 742 includes a plurality of computer system devices that are each capable of executing one or more instances 720 of a particular type created by the computing resource service provider 704. In one embodiment, each of the server computers 742 includes a processor, a data store, an input/output bus, and/or any other component known in the art for executing instances 720. Additionally, the instances 720 may be virtual machine instances. As known in the art, a virtual machine instance is an instance of a software implementation on a machine (i.e., a computer) that executes programs like a physical machine. For example, each of the server computers 742 may be configured to execute an instance manager 718 capable of implementing the instances 720. The instance manager 718 may be a hypervisor, virtualization layer, or another type of program configured to enable the execution of multiple instances 720 on a single server computer 742, for example. As discussed above, each of the instances 720 may be configured to execute all or a portion of an application or a workload associated with a customer. Additionally, the network 706 may be similar to the network as described above. The networked environment 700 may span one or more data centers, where each data center may be geographically distinct from each other. Additionally, the networked environment 700 shown in FIG. 7 may be one of several embodiments employed by the computing resource service provider.

In one embodiment, the computing resource service provider 704 includes a data store containing instance type data 710, an instance service 712, a placement service 726, an auto-scaling service 730, a maintenance service 732, a metrics service 734, a load balancing service 736, and/or other components. The resource data 710 may include data related to the customer workload or applications. For example, in one embodiment, the resource data 710 includes one or more records of customer workload data 746. Each one of the records of the customer workload data 746 corresponds to an execution of a customer workload by a particular set of instances 720. The various services described herein may be implemented using physical hardware such as the server computers 742.

The instance service 712 instantiates instances 720 based at least in part on a set of requirements and/or constraints provided by the customer. Furthermore, the instance service 712 may include a set of server computer systems or other physical hardware including executable code or other logic that, when executed by the server computer system, cause the server computer systems to perform the operations of the instance service 712 as described herein. In one embodiment, the instance service 712 receives, from the customer on the client device 708, a request 738 to create one or more instances 732 and optionally assign the created instances 720 to an auto-scaling group 702. Additionally, the request 738 received from the customer on the client device 708 may also indicate a time to start execution of the requested instances 720. In response to receiving the request, the instance service 712 instantiates instances 720. Furthermore, as described above, the instance service 712 may determine various instance types which may be included in the auto-scale group 702. In various embodiments, the auto-scaling service 730 receives the request and transmits a command to the instance service 712 to instantiate the instances 720 such that the instances are associated with the auto-scaling group, for example, by associating auto-scaling group 702 metadata with the instances 720. The instance service 712 may determine a configuration of instances (e.g., a number of instances of various instance types) and provide the configuration of instances to one or more other computer systems to enable the one or more other computer systems to instantiate the set of instances indicated in the configuration of instances.

Figure 7:
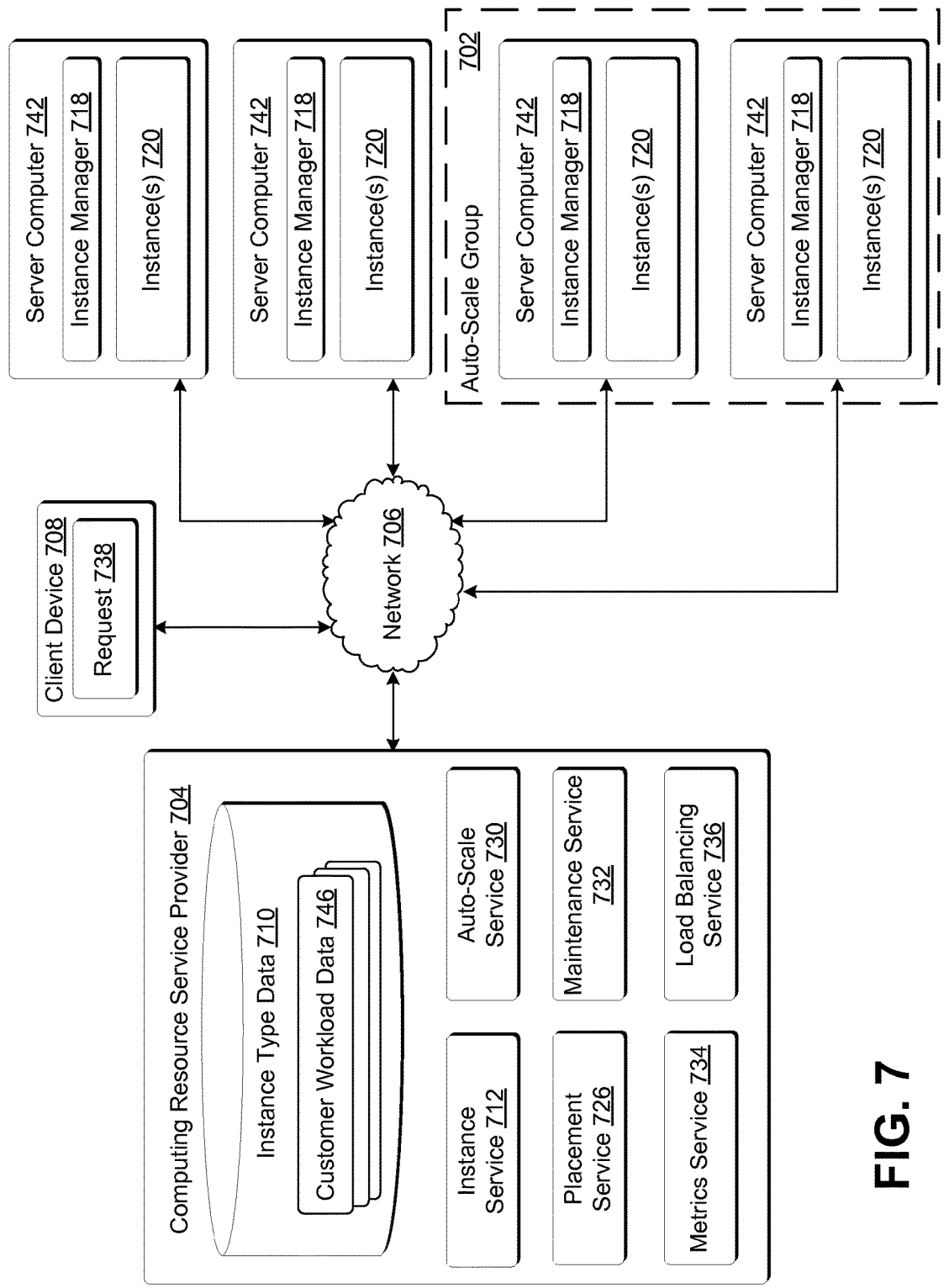
FIG. 7 illustrates an environment in which instances may be instantiated and provisioned within an auto-scale group to execute a customer workload in accordance with an embodiment.

The customer may interact with the computing resource service provider 704 (via appropriately configured and authenticated API calls) to provision, operate virtual, and manage instances 720 that are instantiated on server computers 742 and operated by the computing resource service provider 704. Additionally, the customer may create one or more auto-scaling groups 702, the auto-scaling groups 702 may be a logical collection of instances 720 configured to execute the customer workload or application. Furthermore, the instances 720 may be assigned to the auto-scaling group 702 or may be members of the auto-scaling group 702. The auto-scaling service 730 may allow customers to interact with and manage various auto-scaling groups 702. For example, the customer may, through the auto-scaling service 730, set a maximum or minimum capacity for an auto-scaling group 702. The auto-scaling group 702 may then manage the instances 720 assigned to the auto-scaling group in order to maintain the settings provided by the customer. In various embodiments, the customer may create and manage auto-scaling groups 702 through a management console provided by the computing resource service provider 704. The management console may be exposed to the customer as a webpage, by interacting with the webpage (e.g., through a browser application) the customer may cause API calls to be generated. The generated API calls may cause the computing resource service provider 704 or component thereof to perform various operations indicated by the customer. The instances 720 may be used for various purposes, such as to operate as servers supporting a website, to operate business applications or, generally, to serve as computing power for the customer. Other applications for the instances 720 may be to support database applications, electronic commerce applications, business applications and/or other applications. Although the instance service 712 is shown in FIG. 7, any other computer system or computer system service may be utilized by the computing resource service provider 704, such as a computer system or computer system service that does not employ virtualization or instantiation and instead provisions computing resources on dedicated or shared computers/servers and/or other physical devices.

The placement service 726 provisions the instances 720 to one or more of the server computers 742. In one embodiment, the placement service 726 determines the server computers 742 to provision the new instances 720 based at least in part on the indicated auto-scaling group 702 of the new instances 720. In another embodiment, the placement service 726 determines the server computers 742 to provision the new instances 720 based at least in part on requirements and/or constraints provided by the customer as described above. For example, the placement service 726 may identify one or more server computers 742 with the appropriate capacity to execute the instances 720. To this end, the placement service 726 determines the capacity of each server computer 742 and instances from the instance type data 710 stored in the data store and accordingly provisions the instances 720. Furthermore, the placement service 726 may determine placement of the instances 720 based at least in part on a work rate determined from the customer workload data 746. The work rate may indicate a rate at which the instances 720 are processing the customer workload.

The auto-scaling service 730 automatically scales the capacity of a collection of previously requested instances 720 up or down based at least in part on circumstances defined by the customer that requested the instances 720. For example, the auto-scaling service 730 may decrease the number of instances 720 allocated to the customer during demand lulls and increase the number of instances 720 allocated to the customer during demand peaks. In one embodiment, the auto-scaling service 730 sheds a subset of the requested instances 720 during a period of low usage and/or idle time. For example, the auto-scaling service 730 may determine that the amount of instances 720 requested by the customer is redundant and/or excessive. In response, the auto-scaling service 730 may terminate a certain number of instances 720 allocated to the customer such that the remaining number of instances 720 allocated to the customer is not redundant and/or excessive. In another embodiment, the auto-scaling service 730 may shed the subset of the requested instances 720 if the usage rate does not exceed a predetermined threshold. Similarly, the auto-scaling service 730 increases the amount of instances 720 during a period of high usage. In one embodiment, the auto-scaling service 730 may increase the amount of instances 720 if the usage rate exceeds a predetermined threshold.

The maintenance service 732 schedules maintenance, software updates, and/or firmware updates for the server computers 742. In one embodiment, the maintenance service 732 schedules the maintenance and software updates at an appropriate time based at least in part on the available capacity of the server computers 742. For example, the maintenance service 732 may schedule the maintenance and software updates at a time when the respective server computer 742 has a projected availability. In one embodiment, the maintenance service 732 may patch and restart the server computers 742 when the maintenance service 732 determines that the server computer 742 is not hosting any instances 720. Additionally, the maintenance service 732 may patch virtual machines associated with the instance 720 if necessary prior to instantiating new images that are associated with the respective virtual machines. For example, the maintenance service 732 may schedule a patch of the machine image based at least in part on the health status of the instances 720. In one embodiment, no additional instances may be provisioned on the server computer 742 until the scheduled maintenance is completed.

The maintenance service 732 may also periodically or aperiodically check the health status of the instances 720, including instances assigned to the auto-scaling group 702. The health check may include determining the load, utilization, and operation of various components of the instances 720 such as the central processing unit, memory, networking interface, operating system, application, and other components of the instances 720. In various embodiments, when the maintenance service 732 determines that an instance 720 is unhealthy, based at least in part on the health check, the maintenance service 732 or other component of the service provider 704, such as the auto-scaling service 730, may initiate a workflow to terminate the unhealthy instance.

The metrics service 734 may be responsible for collecting instance type 710 and customer workload data corresponding to the instances 720. The instance type 710 obtained by the metrics service 734 may indicate the utilization of various components of the instances 720 such as the central processing unit, memory, networking interface, operating system, applications, and other components of the instances 720. Furthermore, the utilization information may be used to determine a capacity associated with the instances 720 as described above in connection with FIG. 2. The customer workload data 746 may indicate a work rate associated with the instances 720 when executing the customer workload. For example, the customer workload data 746 may indicate a number of images transcoded by a particular instance type over an interval of time. This information may be used for a variety of different purposes, for example, determining a relative capacity of various instance types when executing the customer workload or application. Additionally, the information may be used by the maintenance service 732 to determine the health of an instance 720 and/or a server computer 742. The metrics service 734 may obtain and aggregate utilization information for all of the instances 720 executing the customer workload or application.

A load balancing service 736 may be offered to customers of a computing resource service provider 704 in order to facilitate request processing by instances 720. In various embodiments, the instances 720 may be assigned to the auto-scaling group 702 and the load-balancing service 736 may distribute traffic to the instances 720 assigned to the auto-scaling group 702. For example, the customer may operate a website using instances 720 assigned to the auto-scaling group 702 using the resources of computing resource service provider 7044. Additionally, the website may receive requests from multiple other customers over the network 706. The computing resource service provider 704 may configure a load balancer of the load balancing service 736 to direct the requests to the instances 720 of the auto-scaling group 702 executing the website in such a way that the load generated by processing the requests is distributed among the instances 720 of the auto-scaling group 702 executing the website. The load balancing service 736 may be a computer system or virtual computer system configured to distribute the request to the instances 720 assigned to the load balancer in order to optimize resource utilization and/or avoid overloading a particular server computer 742. For example, the load balancer may include physical hardware connected to a server rack or otherwise included in a data center. In another example, the load balancer may include one or more virtual machines supported by server computer 742. In various embodiments, the load balancer may obtain instance type data 710 and/or customer workload data 746 and distribute traffic to the instances 720 based at least in part on the obtained instance type data 710 and/or customer workload data 746. For example, the load balancing service 736 may distribute traffic based at least in part on a capacity of a particular instance type indicated in the instance type data 710. Similarly, the load balancing service 736 may distribute traffic based at least in part on a work rate of a particular instance type indicated in the customer workload data 746.

Figure 8:
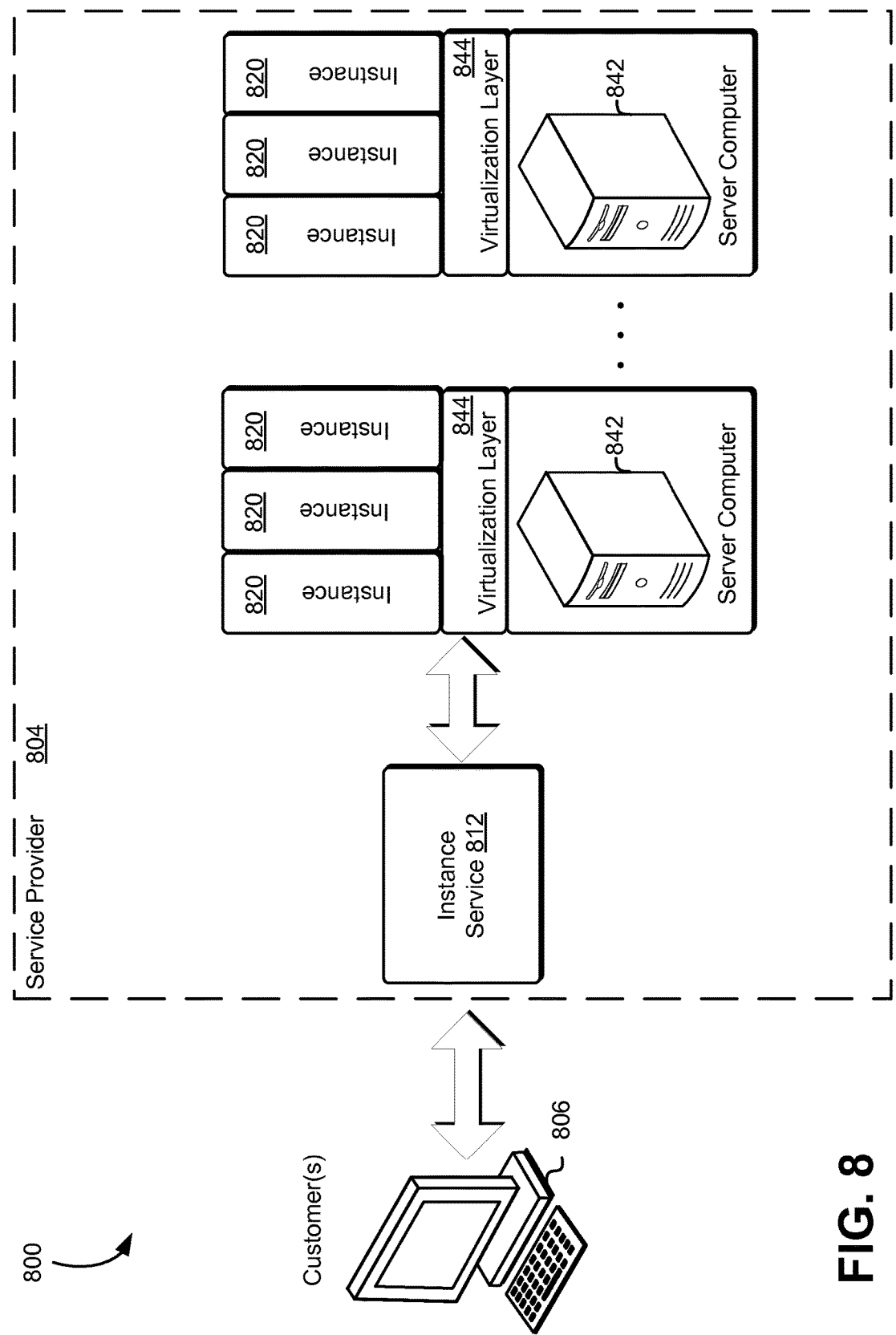
FIG. 8 illustrates an environment in which an instance service may manage instances of various types executing a customer workload in accordance with an embodiment.

FIG. 8 illustrates an instance service 812 in accordance with at least one embodiment. The instance service 812, which may be implemented by physical hardware, is used by a service provider 804 to provide computation resources for customers 806. The physical hardware may include a server computer 842. The server computer 842 may be any device or equipment configured to execute instructions for performing data computation, manipulation, or storage tasks, such as a computer or a server. A server computer 842 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 844 may include a bare metal hypervisor or a hosted hypervisor. The virtualization layer 844 executing on the service computer 842 enables the physical hardware to be used to provide computational resources upon which one or more computer instances 820 may operate. For example, the virtualization layer may enable a computer instance 820 to access physical hardware on the server computer 842 through virtual device drivers on the computer instance 820. The virtualization layer 844 may include a hypervisor or virtualization software and/or hardware. The virtualization layer may also include an instance of an operating system dedicated to administering the computer instances 820 running on the server computer 842. Each virtualization layer 844 may include its own networking software stack, responsible for communication with other virtualization layers 844 and, at least in some embodiments, also responsible for implementing network connectivity between the computer instances 820 running on the server computer 842 and other computer instances 820 running on other server computers 842. When multiple computer instances 820 are supported by the same virtualization layer 844 supported by a server computer, the computer instance 820 may compete for capacity (e.g., utilization of the physical hardware such as memory and processing cycles). There may be a fixed amount of the CPU capacity that is allocated to each computer instance 820 such that each computer instance 820 gets at least some certain amount of the capacity. However, when computer instances 820 are not competing (e.g., the server computer 842 has less than maximum load placed on the computing resources of the server computer 842), the computer instances 820 may be able to utilize additional capacity. In addition, the computer instances 820 may be allocated less capacity (e.g., allocated less computing resources) so long as certain statistics regarding capacity (e.g., average CPU available to the instance), which in some circumstances are predetermined and/or monitored, are met. CPU capacity may include a particular amount of CPU capacity that is maintained and/or reserved for the duration of execution of the computer instance 820. In another example, the CPU capacity may be an average amount of CPU capacity available to the computer instance 820 during execution. Other examples of CPU capacity include, but at not limited to, allocation of CPU capacity with respect to a minimum CPU capacity available to the computer instance, average CPU capacity available to the computer instances, and bursting (e.g., maximum) CPU capacity available to the computer instance for a specified burst period depending on an amount of capacity available to the server computer 842. The average CPU capacity may be calculated based at least in part on the system load of the computer instance over a period of time. In some embodiments, two or more CPU capacity allocation types may be combined.

Furthermore, the server computer 842 may host multiple virtualization layers 844 of the same or different types on the same server computer 842. The virtualization layer 844 may be any device, software, or firmware used for providing a virtual computing platform for the computer instances 820. The virtual computing platform may include various virtual computer components, such as one or more virtual CPUs, virtual memory, and the like. The computer instances 820 may be provided to the customers 806 of the service provider 804 and the customers 806 may run an operating system or an application on the computer instances 820. Further, the service provider 804 may use one or more of its own computer instances 820 for executing its applications. At least a portion of the computer instances 820 may execute kernel-level components for one or more other computer instances 820. For example, a particular computer instance may execute a parent partition configured to manage one or more child partitions executed by other computer instances, where the particular computer instance and the other computer instances are supported by the same virtualization layer 844.

Commands and other information may be included in an API call from the virtual machine management service 812 to the virtualization layer 844. The virtual machine management service 812 may enable the customers 806 to manage and operate the computer instances 820. For example, the customers 806 may transmit a request to the virtual machine management service 812 to terminate all computer instances 820 operated by the customers 806. The request may be an API call including information corresponding to the customers 806 and computer instances 820.

The virtual machine management service 812 may determine the corresponding virtualization layer 844 for the computer instances 820 included in the request and transmit a terminate command to the virtualization layer 844. The virtual machine management service 812 may be implemented in at least some embodiments, enabling a variety of client applications to run on virtual computer servers or computer instances 820 instantiated on behalf of the customers 806. The computer instances 820 may each comprise a virtual machine, with its own operating system comprising a networking software stack, and multiple such instances may be hosted on a given server computer 842 at a service provider network data center.

Figure 9:
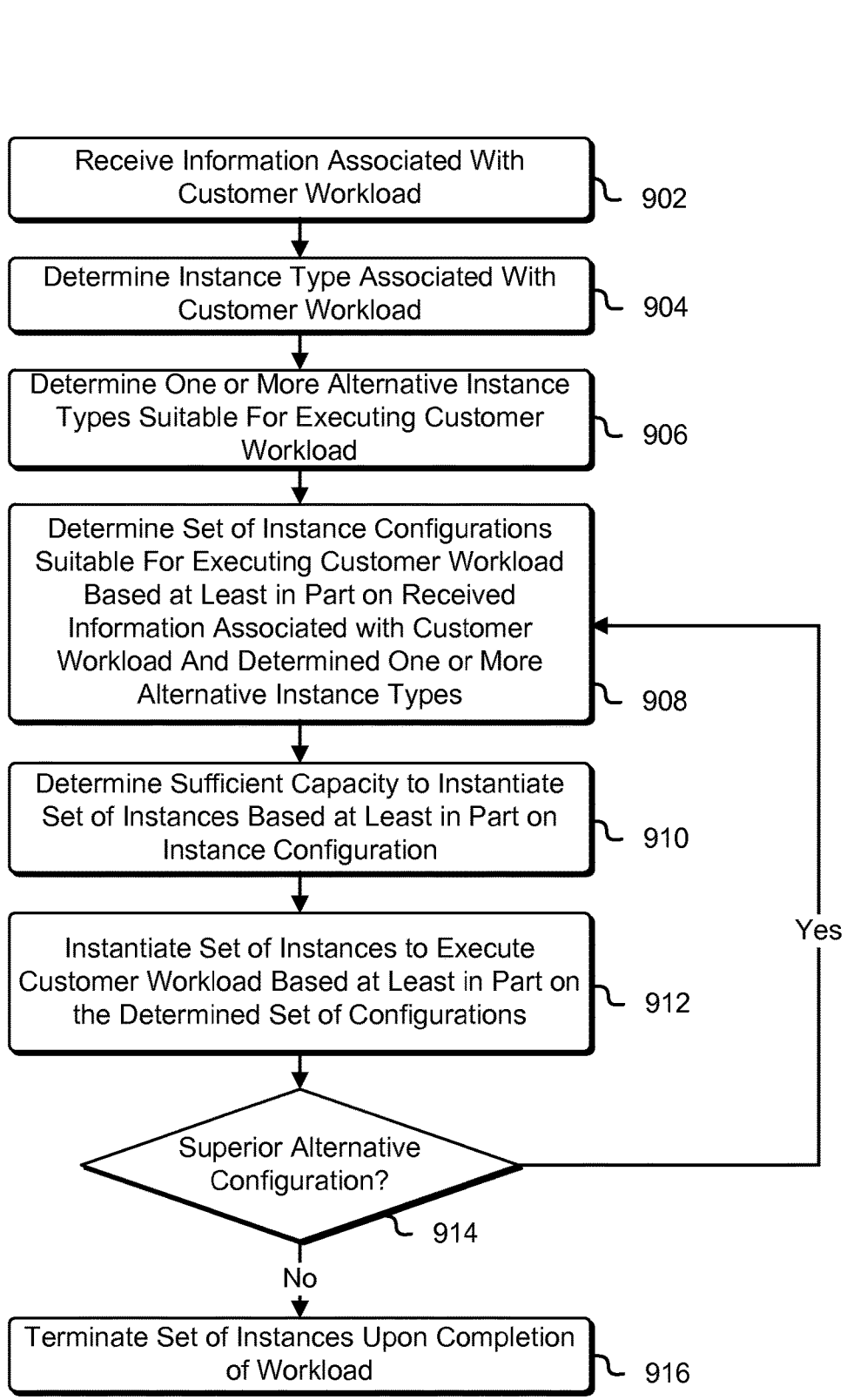
FIG. 9 shows an illustrative process for executing a customer workload utilizing instances of various types in accordance with an embodiment.

FIG. 9 shows an illustrative example of a process 900 for determining a set of instances of various instance types to execute a customer workload or application in accordance with an embodiment. The process 900 may be performed by any suitable system such as by a backend server or an instance service as described above. Generally, any computer system with access to server computer systems capable of instantiating a set of computing system instances may perform the process 900 and variations thereof. In an embodiment, the system performing the process 900 receives information associated with the customer workload or application 902. The information may include requirements and/or constraints as described above. The information associated with the customer workload may be received from the customer or other service of the computing resource service provider such as a metrics service. Additionally, the information may be determined based at least in part on information collected from various instances during execution of various customer workloads. For example, the instance service may determine a capacity requirement of the particular customer workload based at least in part on information obtained from instance executing the particular customer workload.

The system performing the process 900 may then determine an instance type associated with the customer workload 904. The instance type may be a preferred instance type provided by the customer as described above. The system performing the process 900 may then determine one or more alternative instance types suitable for executing the customer workload 906. The one or more alternative instance types may be indicated by the customer or may be determined by the instance service based at least in part on capacity information associated with the one or more alternative instance types and the requirements and/or constraints of the customer workload. The system performing the process 900 may then determine a set of configurations of instance types suitable for executing the customer workload based at least in part on the information associated with the customer workload and then determine one or more alternative instance types 908. For example, the instance service may determine alternative instance types which may be included in an instance group that satisfies the capacity requirements and constraints of the customer's workload.

Once the system performing the process 900 has determined a set of instance configurations (e.g., a set of instance groups comprising computer system instances of one or more instance types suitable for executing the customer's workload), a determination may be made as to whether there is sufficient capacity to instantiate a set of instances according to a particular instance configuration 910. For example, a particular instance configuration may include two standard large instances and one memory optimized large instance. The system performing the process 900 may determine if there are sufficient computing resources available to execute two standard large instances and one memory optimized large instance. In addition, in some embodiments, the capacity of the computer systems may be determined before determining a particular instance configuration, such that the particular configuration is selected based on the available instances in the computer system. The capacity may be distributed between data centers and/or computer servers. Returning to the example above, the two standard instances may be executed by a first server computer system and the memory optimized large instance may be executed by a second server computer system. The system performing the process 900 may then instantiate a set of instances configured to execute the customer workload based at least in part on the determined set of instance configurations 912. For example, the instance service may instantiate 2 standard extra-large instances and one memory optimized double extra-large instance according to a particular instance configuration of the set of instance configurations which satisfy the customer's capacity requirements and constraints. As described above, an instance configuration indicates a number of instance types and a number of computing instances for each instance type to be included in a group of computing instances configured to execute the customer workload or application. For example, a particular instance configuration may indicate four standard large instance and two standard extra-large instances.

Furthermore, the system performing the process 900 may be configured to monitor the execution of the workload to determine whether a superior alternative configuration of instance types may be instantiated 914. During execution of the customer workload, if a constraint associated with the customer workload, requirement associated with the customer workload, or attribute of the instance service modifies an alternative configuration of instance it may better satisfy the customer's requirements and/or constraints. For example, if the price for a particular instance type decreases an alternative configuration utilizing the particular instance type may better satisfy the customer's requirements and constraints. During the execution of the workload, if no alternative configurations better satisfy the customer requirements and constraints, the system performing the process 900 may terminate the set of instances upon completion of workload 916. In numerous variations to the process 900, the set of instances may not be terminated, and may be made available to the customer to execute additional workloads.

Figure 10:
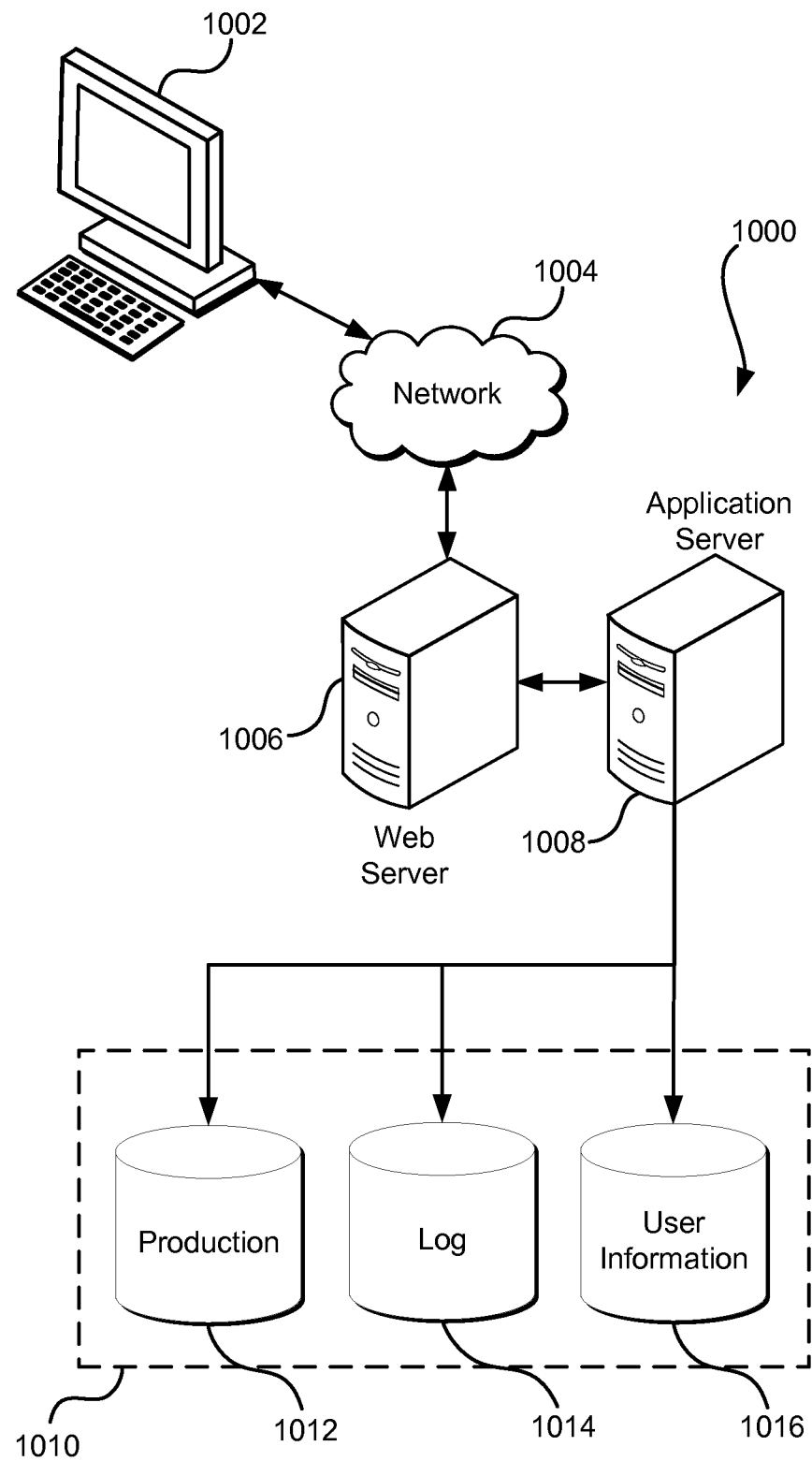
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP; Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a set of requirements associated with a workload, where the set of requirements indicate an amount of computing resources to be allocated to a set of instances to execute the workload;
    obtaining a constraint associated with execution of the workload by the set of instances;
    determining that an instance type satisfying the set of requirements is unavailable for execution of the workload, the instance type being a member of a set of instance types;
    determining, based at least in part on a weight associated with a user preference for a certain instance type and a benchmark associated with an alternative instance type of the set of instance types, a configuration that indicates the alternative instance type that satisfies both the set of requirements and the constraint;
    instantiating the set of instances based at least in part on the configuration; and
    executing the workload utilizing the set of instances.

2. The computer-implemented method of claim 1, wherein the set of requirements include at least one of: a number of virtual central processing units, an amount of memory, or an amount of storage capacity.

3. The computer-implemented method of claim 1, wherein the constraint includes at least one of:
    an interval of time the workload must be completed by, an interval of time after which the workload is to start, a total cost of executing the workload, a maximum number of instances in the set of instances, a minimum number of instance included in the set of instances, or a maximum execution time of the workload.

4. The computer-implemented method of claim 1, wherein the computer-implemented method further comprises:
    determining an alternate configuration of the set of instances that satisfy the set of requirements and the constraint better than the configuration of the set of instances; and
    modifying the set of instances based at least in part on the alternate configuration.

5. The computer-implemented method of claim 1, wherein the at least one alternative instance type is further determined based at least in part on one or more of:
    bandwidth of a connection of the at least one alternative instance type; or
    latency of the connection of the at least one alternative instance type.

6. The computer-implemented method of claim 1, wherein the at least one alternative instance type is further determined based at least in part on one or more of:
    business value of the alternative instance type, or
    economic value of the alternative instance type.

7. A system, comprising:
    at least one computing device configured to:
        receive a request to execute a workload;
        obtain capacity requirements for the workload to be executed using a set of computing system instances of instance types supported by computing resources of the system;

obtain a constraint associated with the workload to be applied to the set of computing system instances executing the workload;

determine, based at least in part on the capacity requirements, the constraint, a benchmark, and a weight associated with a preference of a user, a configuration of an instance type to include in the set of computing system instances, the instance type being selected from a set of instance types, where the set of instance types has instance types with different benchmarks and characteristics based at least in part on the computing resources for the instance type;

instantiate the set of computing system instances based at least in part on the configuration; and cause the set of computing system instances to execute the workload.

8. The system of claim 7, wherein the at least one computing device is further configured to obtain a set of alternative instances types, where the set of alternative instance types are selected from the set of instance types.

9. The system of claim 7, wherein the at least one computing device is further configured to receive a request for a particular instance type to execute the workload, and to determine there is insufficient capacity to execute the workload utilizing instances of the particular instance type, and determine the configuration of the instance type to include in the set of computing system instances.

10. The system of claim 9, wherein the at least one computing device is further configured to determine, as a result of determining there is insufficient capacity, a subset of instance types of the set of instance types with sufficient computing resources to satisfy the capacity requirements.

11. The system of claim 7, wherein the constraint associated with the workload comprises a total cost of executing the workload.

12. The system of claim 7, wherein the constraint associated with the workload comprises a maximum interval of time during which the workload can be executed.

13. The system of claim 7, wherein the at least one computing device is further configured to modify the instance type included in the set of computing system instances based at least in part on a modification to the capacity requirements or the constraint.

14. A non-transitory computer-readable storage medium having stored thereon executable instructions that, as a result of being executed by one or more processors of a computer system, cause the computer system to at least:

obtain a capacity requirement associated with a workload utilizing a set of computing system instances of a first instance type, the capacity requirement indicating an amount of a computing resource required by the set of computing system instances to execute the workload;

generate a determination that there are insufficient computing system instances of the first instance type available to execute the workload;

determine, based at least in part on the determination, a weight that indicates a preferred instance type, and a benchmark associated with an alternative instance type, a configuration of computing system instances that includes the alternative instance type, the configuration having a total capacity sufficient to at least meet the capacity requirement; and provide the configuration to enable the set of computing system instances to execute the workload.

15. The non-transitory computer-readable storage medium of claim 14, wherein the executable instructions that cause the computer system to obtain the capacity requirement further include instructions that cause the computer system to determine the capacity requirement based at least in part on the workload.

16. The non-transitory computer-readable storage medium of claim 14, wherein the executable instructions that cause the computer system to determine the configuration of computing system instances further comprise instructions that, as a result of being executed by the one or more processors, cause the computer system to determine the configuration of computing system instances based at least in part on a performance constraint associated with the set of computing system instances.

17. The non-transitory computer-readable storage medium of claim 14, wherein the executable instructions further comprise instructions that, as a result of being executed by the one or more processors, cause the computer system to modify the set of computing system instances based at least in part on collected benchmark information such that at a subset of the set of computing system instances are of an alternative instance type.

18. The non-transitory computer-readable storage medium of claim 14, wherein the executable instructions further comprise instructions that, as a result of being executed by the one or more processors, cause the computer system to provide information indicating a work rate for the at least one other instance type during execution of the workload to a metrics service.

19. The non-transitory computer-readable storage medium of claim 18, wherein executable the instructions further comprise instructions that, as a result of being executed by the one or more processors, cause the computer system to modify the set of computing system instances based at least in part on collected information indicating the work rate of the at least one other instance type such that a subset of the set of computing system instances are of an alternative instance type.

20. The non-transitory computer-readable storage medium of claim 14, wherein the executable instructions that cause the computer system to determine the configuration of computing system instances further comprise instructions that, as a result of being executed by the one or more processors, cause the computer system to determine the configuration of computing system instances based at least in part on availability of the computing system instances at a computing resource service provider.

21. The non-transitory computer-readable storage medium of claim 14, wherein the executable instructions further comprise instructions that, as a result of being executed by the one or more processors, cause the computer system to:

generate a score associated with first instance type and the at least one other instance type based at least in part on an amount of computing resources assigned to the first instance type and a second amount of computing resources assigned to the at least one other instance type; and determine an alternative configuration of computing system instances based at least in part on the generated score.

* * * * *

UNITED STATES PATENT AND TRADEMARK OFFICE
CERTIFICATE OF CORRECTION

PATENT NO. : 10,362,099 B2
APPLICATION NO. : 14/748198
DATED : July 23, 2019
INVENTOR(S) : Derek Solomon Pai et al.

It is certified that error appears in the above-identified patent and that said Letters Patent is hereby corrected as shown below:

On the Title Page

Item (72) Inventor:
"Derek Soloman Pai, Seattle, WA (US)"

Should read:
--Derek Soloman Pai, Seattle, WA (US)
David Ward, Seattle, WA (US)
Joby Lafky, Seattle, WA (US)
Stephen Elliott, Seattle, WA (US)
Aniruddha Daptardar, Redmond, WA (US)
Joshua Burgin, Seattle, WA (US)--

Signed and Sealed this
Twenty-second Day of September, 2020

Andrei Iancu
*Director of the United States Patent and Trademark Office*